US011743112B2

(12) United States Patent
Sakhnini et al.

(10) Patent No.: US 11,743,112 B2
(45) Date of Patent: Aug. 29, 2023

(54) UE REQUESTED BFD/BFR REFERENCE SIGNAL

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 17/314,986

(22) Filed: May 7, 2021

(65) Prior Publication Data

US 2021/0359903 A1 Nov. 18, 2021

Related U.S. Application Data

(60) Provisional application No. 63/023,511, filed on May 12, 2020.

(51) Int. Cl.
*H04L 41/0668* (2022.01)
*H04L 41/0677* (2022.01)
*H04L 5/00* (2006.01)

(52) U.S. Cl.
CPC ........ *H04L 41/0668* (2013.01); *H04L 5/0048* (2013.01); *H04L 41/0677* (2013.01)

(58) Field of Classification Search
None
See application file for complete search history.

(56) References Cited

U.S. PATENT DOCUMENTS

| 11,337,265 | B2* | 5/2022 | Zhou | H04L 27/2692 |
|---|---|---|---|---|
| 2018/0302889 | A1 | 10/2018 | Guo et al. | |
| 2019/0253949 | A1 | 8/2019 | Park et al. | |
| 2019/0327769 | A1* | 10/2019 | Yang | H04W 72/046 |
| 2019/0372830 | A1* | 12/2019 | Zhang | H04L 41/0894 |
| 2020/0127883 | A1* | 4/2020 | Liu | H04W 74/0833 |
| 2020/0136715 | A1* | 4/2020 | Venugopal | H04W 72/0453 |
| 2020/0136895 | A1* | 4/2020 | Venugopal | H04L 41/0668 |
| 2020/0145083 | A1* | 5/2020 | John Wilson | H04B 7/0695 |
| 2020/0145280 | A1* | 5/2020 | Cirik | H04W 72/0413 |
| 2020/0178338 | A1* | 6/2020 | Ahn | H04B 7/0626 |
| 2020/0404559 | A1* | 12/2020 | Koskela | H04W 72/23 |
| 2021/0006456 | A1* | 1/2021 | Kim | H04W 72/046 |
| 2021/0028853 | A1* | 1/2021 | Wu | H04B 7/0626 |
| 2021/0099216 | A1* | 4/2021 | Takeda | H04B 7/088 |
| 2021/0314218 | A1* | 10/2021 | Kang | H04B 7/0695 |

(Continued)

OTHER PUBLICATIONS

International Search Report and Written Opinion—PCT/US2021/031639—ISA/EPO—dated Sep. 21, 2021.

(Continued)

*Primary Examiner* — Kenny S Lin
(74) *Attorney, Agent, or Firm* — Procopio, Cory, Hargreaves & Savitch

(57) ABSTRACT

This disclosure provides systems, devices, apparatus and methods, including computer programs encoded on storage media, for a UE-requested BFD/BFR reference signal. In aspects, the UE may transmit, to a base station, a request for a list of a set of beams for BFD and a list of a set of candidate beams for BFR. The UE may receive, from the base station based on the transmitted request, information indicating the set of beams for BFD and the set of candidate beams for BFR.

32 Claims, 9 Drawing Sheets

(56) References Cited

U.S. PATENT DOCUMENTS

| | | | | |
|---|---|---|---|---|
| 2022/0014253 | A1* | 1/2022 | Xu | H04W 74/0841 |
| 2022/0022065 | A1* | 1/2022 | Wang | H04W 24/08 |
| 2022/0109547 | A1* | 4/2022 | Svedman | H04L 5/0053 |
| 2022/0110181 | A1* | 4/2022 | Miao | H04L 1/1822 |
| 2022/0131591 | A1* | 4/2022 | Huang | H04W 16/28 |
| 2022/0149922 | A1* | 5/2022 | Wang | H04W 76/19 |
| 2022/0174567 | A1* | 6/2022 | Awada | H04W 76/19 |
| 2022/0271817 | A1* | 8/2022 | Lee | H04B 17/382 |
| 2022/0311577 | A1* | 9/2022 | Matsumura | H04L 5/0032 |

OTHER PUBLICATIONS

Partial International Search Report—PCT/US2021/031639—ISA/EPO—dated Jul. 30, 2021.

QUALCOMM: "Beam Failure Recovery Procedure", 3GPP Draft, 3GPP TSG RAN WG2 #92b, R1-1804788_BFRPRO Cedure, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051427055, 10 Pages, Retrieved from the Internet: URL: https://www.3gpp.org/ftp/tsg_ran/WG1_RL1/TSGR1_92b/Docs/ [retrieved on Apr. 15, 2018], 10 Pages, paragraph [03.2], p. 2-p. 3, p. 5-p. 7, the whole document.

\* cited by examiner

UE REQUESTED BFD/BFR REFERENCE SIGNAL

CROSS REFERENCE TO RELATED APPLICATION(S)

This application claims the benefit of U.S. Provisional Application Ser. No. 63/023,511, entitled "UE Requested BFD/BFR Reference Signal" and filed on May 12, 2020, which is expressly incorporated by reference herein in its entirety.

BACKGROUND

Technical Field

The present disclosure relates generally to communication systems, and more particularly, to a user equipment (UE) requested beam failure detection (BFD)/beam failure recovery (BFR) reference signal.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) may be configured by a base station with two reference signal (RS) beam sets (e.g., a first RS beam set for beam failure detection (BFD) and a second RS beam set for beam failure recovery (BFR)). The UE may perform measurements on the beam set for BFD over a predetermined measurement period. If a maximum consecutive beam count of beams determined to be below a threshold measurement value is reached during the measurement period, the UE may perform measurements on candidate beams in the beams set for BFR. If, within an interval of a BFR timer, a candidate beam is determined to be above the threshold measurement value, the UE may initiate a random access channel (RACH) procedure on the candidate beam. Otherwise, the UE may determine that a radio link failure (RLF) has occurred.

Accordingly, the UE may be configured to determine based on movements, rotations, interference patterns, etc., that reception of information on a serving beam is hindered (e.g., by a temporary or permanent obstruction) but that a different beam, such as a beam outside the RS beam sets, may be a suitable alternative to the serving beam. As such, the UE may send a request to the base station including a suitable list of RS beam sets to be used for BFD and/or BFR. If, based on the transmitted request, the base station authorizes the UE to utilize the requested beams in the list, the base station may configure the UE based on all or part of the requested list. The requested list may include beams that are associated with a same cell (e.g., a primary cell (Pcell) or a primary secondary cell (PScell)), or the requested list may include beam subsets that are associated with different cells.

In an aspect of the disclosure, a method, a computer-readable medium, and an apparatus are provided. The apparatus may transmit, to a base station, a request for a list of a set of beams for BFD and a list of a set of candidate beams for BFR. The at least one processor may be further configured to receive, from the base station based on the transmitted request, information indicating the set of beams for BFD and the set of candidate beams for BFR.

In another aspect of the disclosure, a method, a computer-readable medium, and an apparatus are provided. The apparatus may receive, from a UE, a request for a list of a set of beams for beam failure detection and a list of a set of candidate beams for beam failure recovery; and transmit, to the UE based on the received request, information indicating the set of beams for beam failure detection and the set of candidate beams for beam failure recovery.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
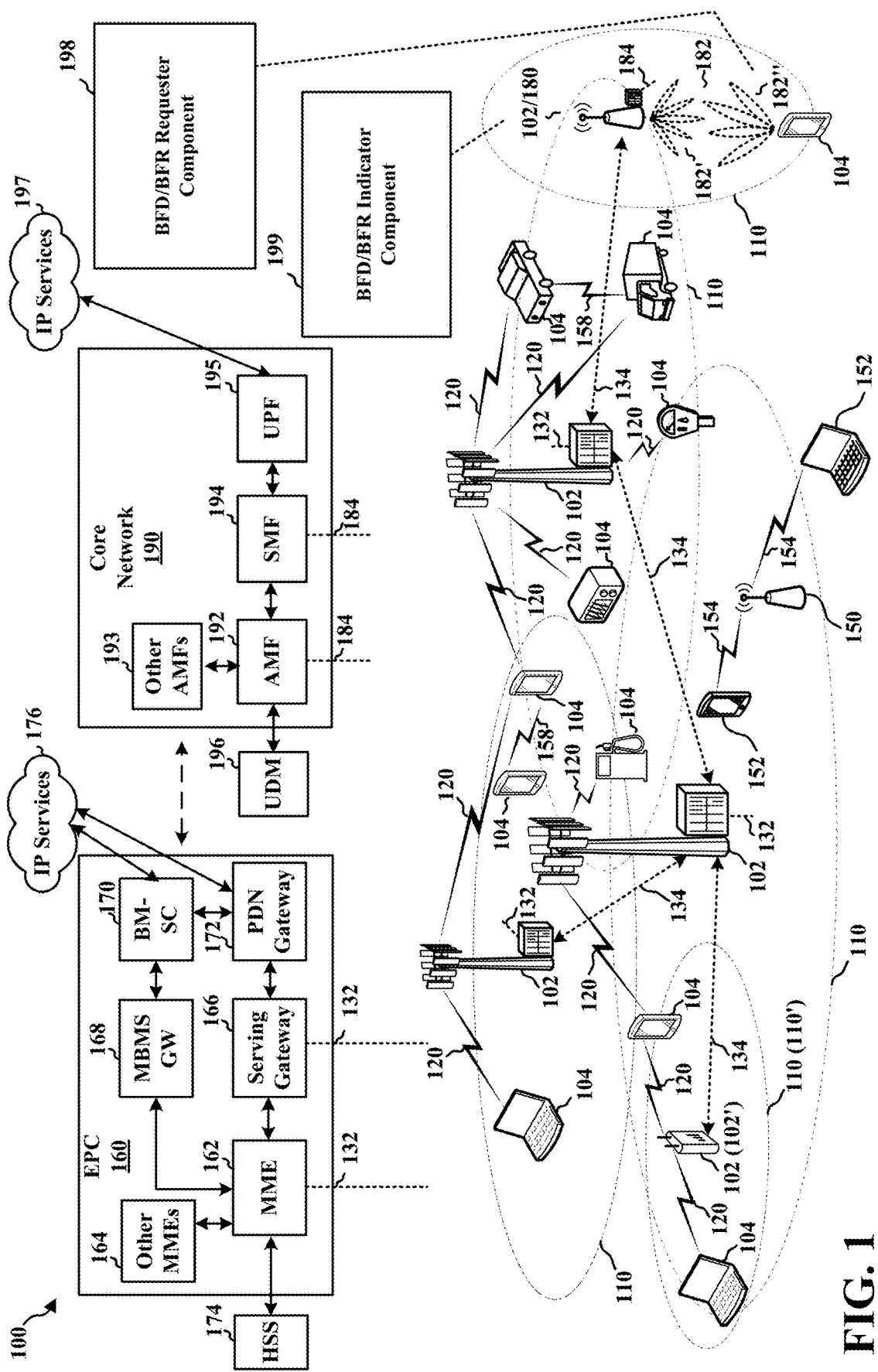
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a beam failure detection (BFD)/beam failure recovery (BFR) requester component 198 configured to: transmit a request for a list of a set of beams for BFD and a list of a set of candidate beams for BFR; and receive, based on the transmitted request, information indicating the set of beams for BFD and the set of candidate beams for BFR. In certain aspects, the base station 180 may include a BFD/ BFR indicator component 199 configured to: receive, from a UE, a request for a list of a set of beams for beam failure detection and a list of a set of candidate beams for beam failure recovery; and transmit, to the UE based on the received request, information indicating the set of beams for beam failure detection and the set of candidate beams for beam failure recovery. Although the following description may be focused on 5G NR, the concepts described herein may be applicable to other similar areas, such as LTE, LTE-A, CDMA, GSM, and other wireless technologies.

Figure 2:
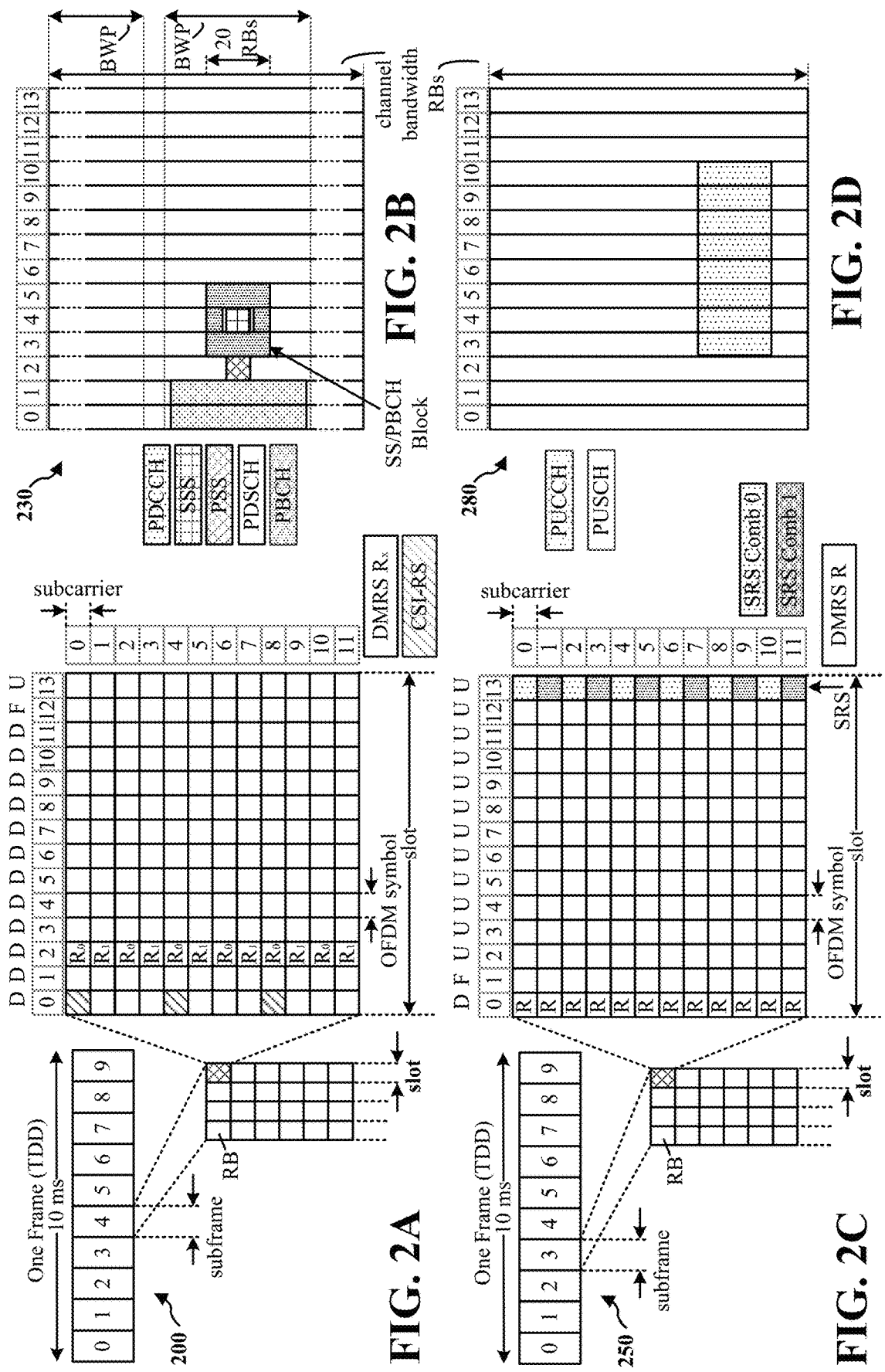
FIG. 2A is a diagram illustrating an example of a first frame, in accordance with various aspects of the present disclosure.
FIG. 2B is a diagram illustrating an example of downlink channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink channels within a subframe, in accordance with various aspects of the present disclosure.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
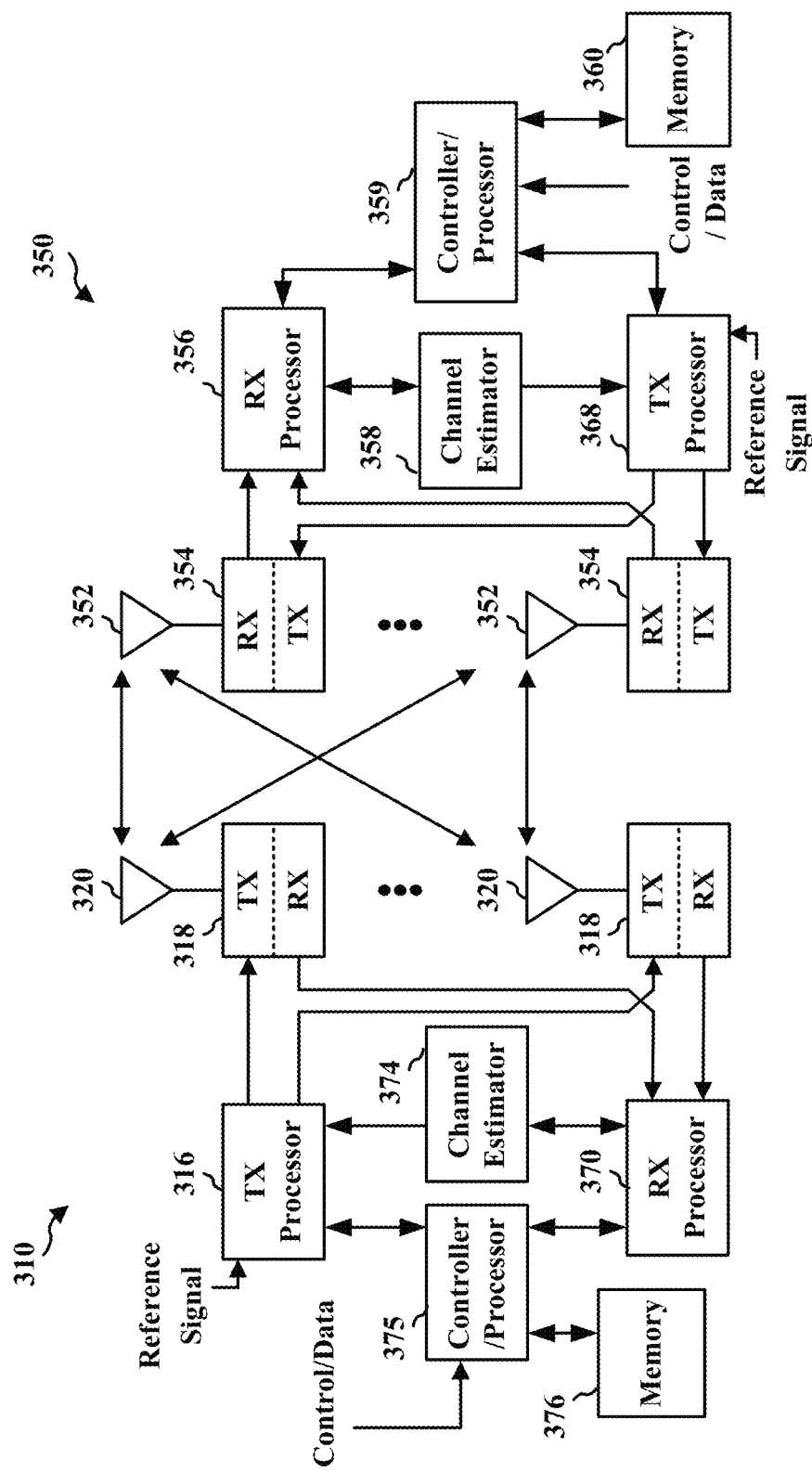
FIG. 3 is a diagram illustrating an example of a base station and a user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the BFD/BFR requester component 198 of FIG. 1.

At least one of the TX processor 316, the RX processor 370, and the controller/processor 375 may be configured to perform aspects in connection with the BFD/BFR indicator component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
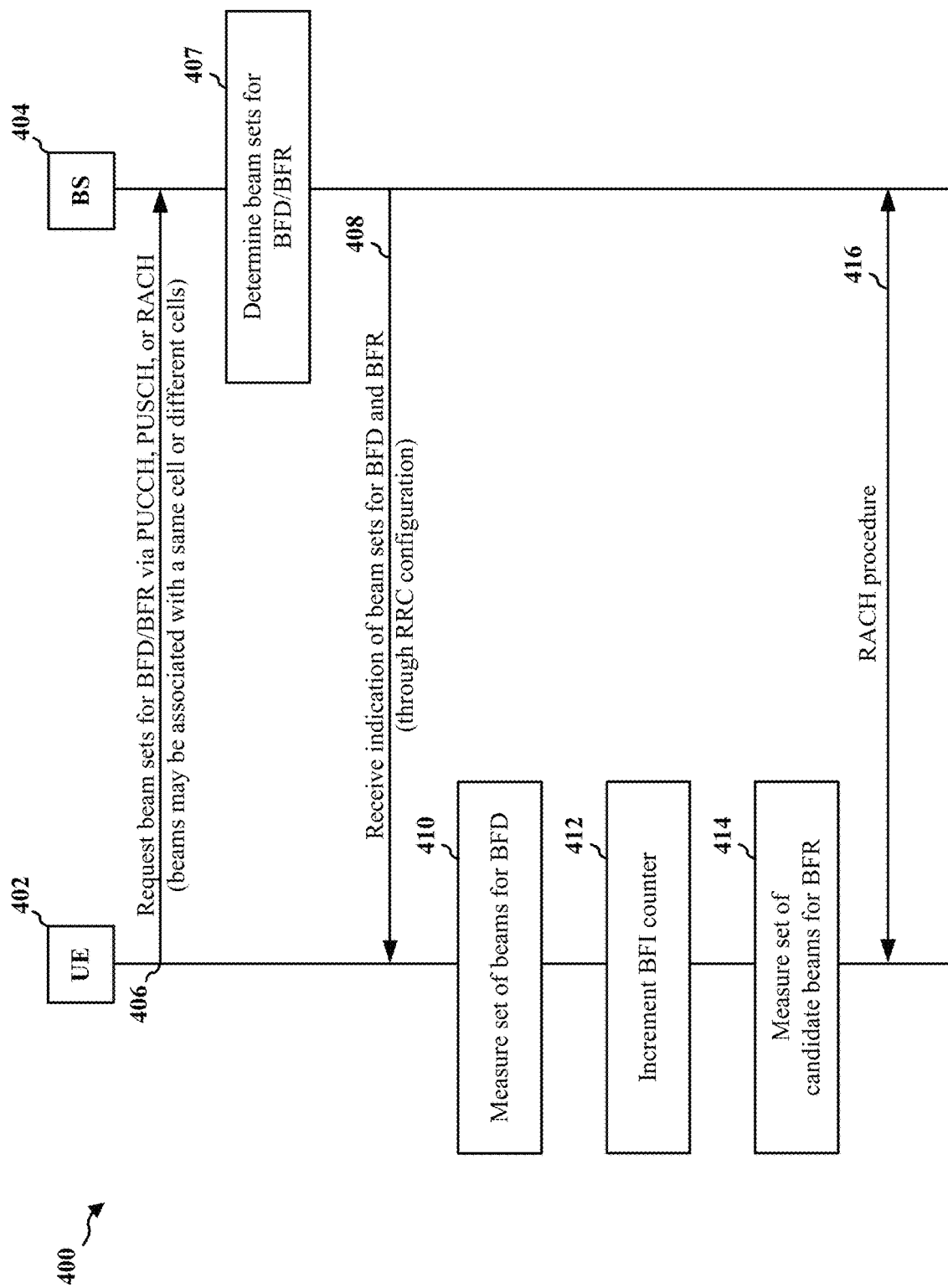
FIG. 4 is a call flow diagram illustrating communications between a UE and a base station.

FIG. 4 is a call flow diagram 400 illustrating communications between a UE 402 and a base station 404. At 406, the UE 402 may transmit a request to the base station 404 for a set of beams for beam failure detection (BFD). Additionally or alternatively, the request transmitted, at 406, to the base station 404 may include a request for a set of candidate beams for beam failure recovery (BFR). The request from the UE 402 to the base station 404 may be transmitted on any of a PUCCH, a PUSCH, or a random access channel (RACH). In some configurations, all of the requested beams of a beam set may be associated with a same cell. For example, all of the beams in the beam set may be associated with a cell of the base station 404 or all of the beams in the beam set may be associated with a second cell of a second base station. In other configurations, some of the requested beams in the beam set may be associated with different cells. For example, a first beam in the beam set may be associated with a cell of the base station 404 and a second beam in the beam set may be associated with a second cell of a second base station.

At 407, the base station 404 may determine the beam sets for BFD and/or BFR. For example, the base station 404 may authorize/grant all or a subset of the set of beams for BFD and/or the set of candidate beams for BFR requested, at 406, by the UE 402. At 408, the UE 402 may receive an indication of whether use of the beam sets requested by the UE 402 for BFD and/or BFR is authorized by the base station 404. For example, authorization of the beam sets corresponding to the transmitted request may be indicated, at 408, from the base station 404 to the UE 402 through a RRC configuration.

At 410, the UE 402 may measure the beams in the requested beam set for BFD. At 412, if the measurement is less than a quality threshold, the UE 402 may increment a beam failure indicator (BFI) counter. At 414, if the BFI counter is equal to or greater than a maximum count, the UE 402 may measure the candidate beams in the requested candidate beam set for BFR. Otherwise, the UE 402 may reset the BFI counter based on expiration of a BFD timer. At 416, if a measurement value of a candidate beam is greater than a second quality threshold, the UE 402 may perform a RACH procedure with the base station 404 based on the candidate beam. Otherwise, the UE 402 may perform an initial acquisition process following expiration of a BFR timer.

Figure 5:
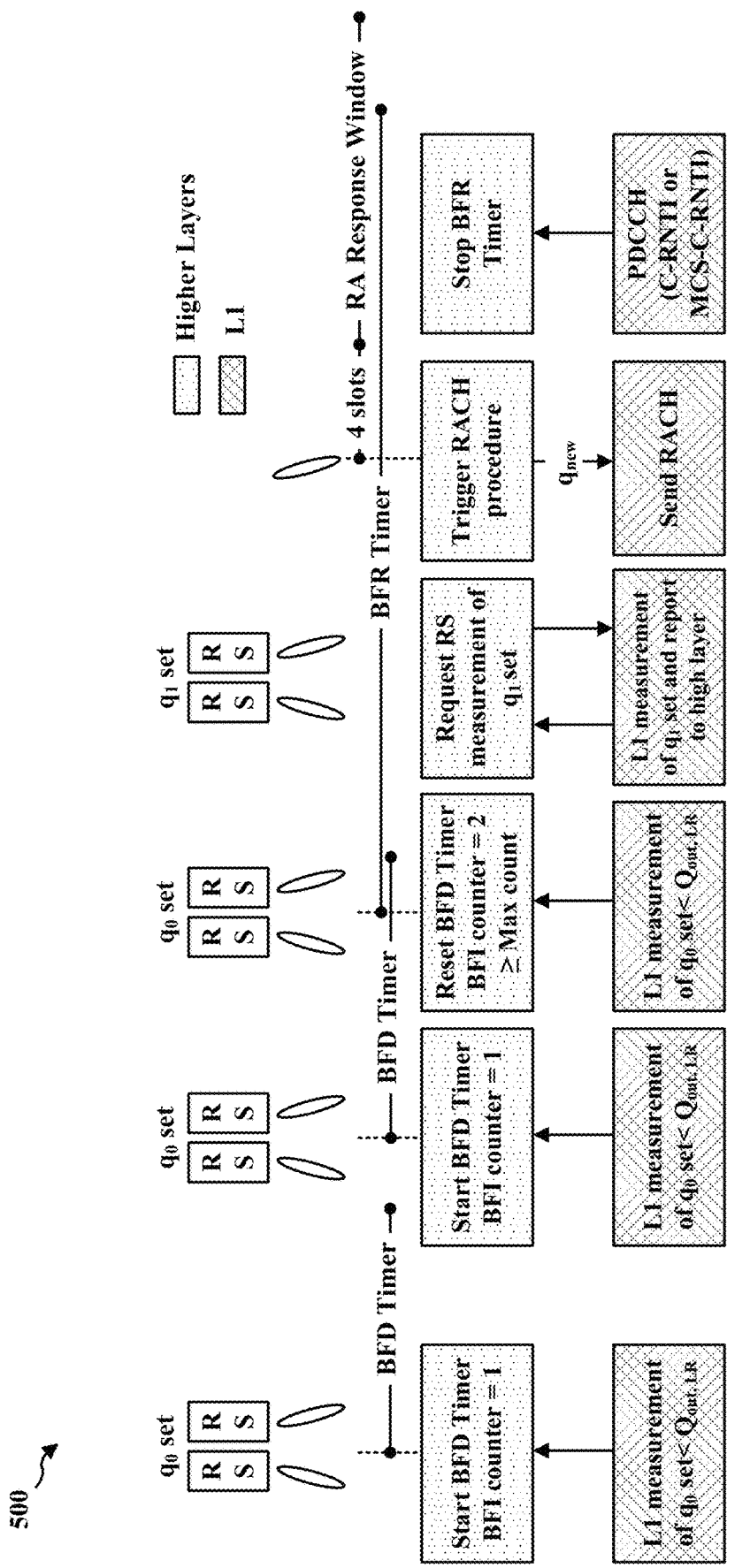
FIG. 5 illustrates a diagram of a beam failure detection (BFD)/beam failure recovery (BFR) procedure.

FIG. 5 illustrates a diagram 500 of a BFD procedure and a beam failure recovery (BFR) procedure. The BFD/BFR procedures may be performed in a non-discontinuous reception (non-DRX) mode for a primary cell (Pcell) and/or a primary secondary cell (PScell). A UE that is wirelessly connected to a base station may be configured with two RS sets (e.g., a $q_0$ set and a $q_1$ set) for measuring signals from the base station. The $q_0$ set may be configured for BFD and may be based on one or more of a CSI-RS and/or a SSB utilized for performing initial measurements. Utilization of a CSI-RS and/or a SSB to measure signals from the base station may be configurable to the UE by the base station.

The UE may perform measurements for the $q_0$ set over a predetermined measurement period associated with a BFD timer (e.g., beamFailureDetectionTimer). If, during the measurement period, the UE determines that a layer 1 measurement value for the RSs in the $q_0$ set is below a threshold (e.g., $Q_{out, LR}$), the UE may increment a BFI counter (e.g., BFI_COUNTER). For example, if both RSs in the $q_0$ set are determined to be below the threshold, the BFI counter may be incremented from 0 to 1. If measurements of all beams in the $q_0$ set are less than $Q_{out, LR}$, the UE may report to higher layers based on a maximum period (e.g., at least a 2 ms CSI-RS/SSB periodicity). Along with incrementing the BFI counter, the UE may initiate the BFD timer. For every report to a higher layer, the BFI counter may be incremented and the BFD timer may be started/restarted. The BFD timer may be set for a predefined interval. If the BFD timer expires and the BFI counter is not incremented to a maximum number of counts (e.g., 2 counts), the BFD timer and the BFI counter may be reset, as the measurement value of a RS in the $q_0$ set may be above the threshold.

If, during a subsequent measurement period, both of the RSs in the $q_0$ set are determined to be below the threshold (e.g., $Q_{out, LR}$) within a same interval of the BFD timer, the BFI counter may be incremented. In examples, a maximum count (e.g., beamFailureInstanceMaxCount) for the BFI counter may be equal to 2. If the maximum count is reached within the BFD timer interval, the UE may determine that a beam failure has occurred (e.g., both beams in the $q_0$ set were measured below the threshold measurement value for a repeated number of instances corresponding to the maximum count), which may trigger a BFR and/or random access channel (RACH) procedure.

A BFR timer (e.g., beamFailureRecoveryTimer) may be initiated while the UE attempts to perform a recovery via another RS included in the $q_1$ set of candidate beams for recovery. The UE may measure beams in the $q_1$ set and report to higher layers the beams that are above a $Q_{in, LR}$ threshold. The $q_1$ set may likewise be configured to the UE and may correspond to another set of RSs (e.g., CSI-RSs and/or SSBs). In some examples, a RS from the $q_0$ set may be included in the $q_1$ set. In other examples, the RSs in the $q_1$ set may be different from the RSs in the $q_0$ set. The UE may scan for candidate beams in the $q_1$ set based on the BFR timer initiated upon detection of the beam failure. If any candidate beams associated with the $q_1$ set are detected above the layer 1 measurement threshold, the UE may initiate a contention-free RACH/physical random access channel (PRACH) procedure on the candidate beam. The RACH may be transmitted to the base station to indicate that BFD has occurred with respect to the $q_0$ set, but that the UE may continue to communicate with the base station based on the candidate beam (e.g., $q_{new}$) in the $q_1$ set.

A timer for a random access (RA) response window may be initiated four slots after the UE sends the RACH. If the base station identifies the RACH on the beam from the UE, the base station may transmit a PDCCH/PDSCH on predefined resources monitored by the UE. An acknowledgment (ACK)/negative acknowledgement (NACK) from the base station in response to the RACH may indicate whether the UE may utilize the beam in the $q_1$ set to resume communications with the base station. If communications are resumed, the beam failure may be determined by the UE as being recovered.

Scanning for the $q_1$ set, sending the RACH, receiving an ACK from the base station, etc., may all occur within the BFR timer interval. If the BFR timer expires before such procedures are completed, the BFR may be unsuccessful and the UE may determine that a radio link failure (RLF) has occurred. Thus, the UE may perform an initial acquisition process by locating SSBs, sending a RACH, etc. to acquire a new connection, where the $q_0$ set, the $q_1$ set, the maximum count, the BFD timer, the BFR timer, the RA response window, the $Q_{out}/Q_{in}$, etc., may again be signaled to/configured for the UE by the base station based on bandwidth parts (BWPs) of the serving cell UE.

For reduced capability devices including stationary devices (e.g., industrial wireless sensors) or rotating devices (e.g., video surveillance devices), and for non-reduced capability devices, a temporary or permanent obstruction to a serving beam may prevent such devices from receiving information on the serving beam. For rotating devices/UEs that receive different beams in a recurring manner as the UE moves/rotates, a pattern of interference may be determined by the UE based on such movements. Accordingly, the UE may be configured to determine whether a first RS set (e.g., the $q_0$ set, the $q_1$ set, or some other set) is indicative of an improved signal quality over a second RS set. As a result, the UE may indicate the determined (e.g., suitable) RS set to the base station.

In an example, a location of the UE may correspond to two different cells, such that the UE may not detect a beam of a first cell (e.g., located at 90 degrees), but may detect a beam of a second cell (e.g., located at 0 degrees). If the UE is currently utilizing the first cell, which may be associated with an obstruction, the UE may indicate to the network based on internal measurements at the UE that utilizing the second cell may be a suitable alternative to utilizing the first cell. Accordingly, the network may configure the UE with a $q_1$ set associated with the second cell to perform a BFR procedure.

The UE may send a request to the base station including a suitable list of $q_0$ set(s) to be used for BFD and/or a suitable list of $q_1$ set(s) to be used for candidate recovery beams. While the UE may not have control over whether the UE is configured with certain RS sets, the UE may still transmit a suitable list of RS sets to the base station for which the base station may or may not grant. If the base station grants the request, the UE may be configured with all or part of the requested list(s) using a RRC. The requested list(s) of the UE may be transmitted to the base station on a PUCCH (e.g., layer 1 message), a PUSCH (e.g., MAC-CE), or a RACH. In aspects, the RS set may be configured for just one cell or the RS set may be configured across different cells. For example, the UE may transmit a request including a suitable list of RS sets, which may be for a same cell or across different cells, such that BFR may similarly be performed on the same cell or may be across the different cells.

Figure 6:
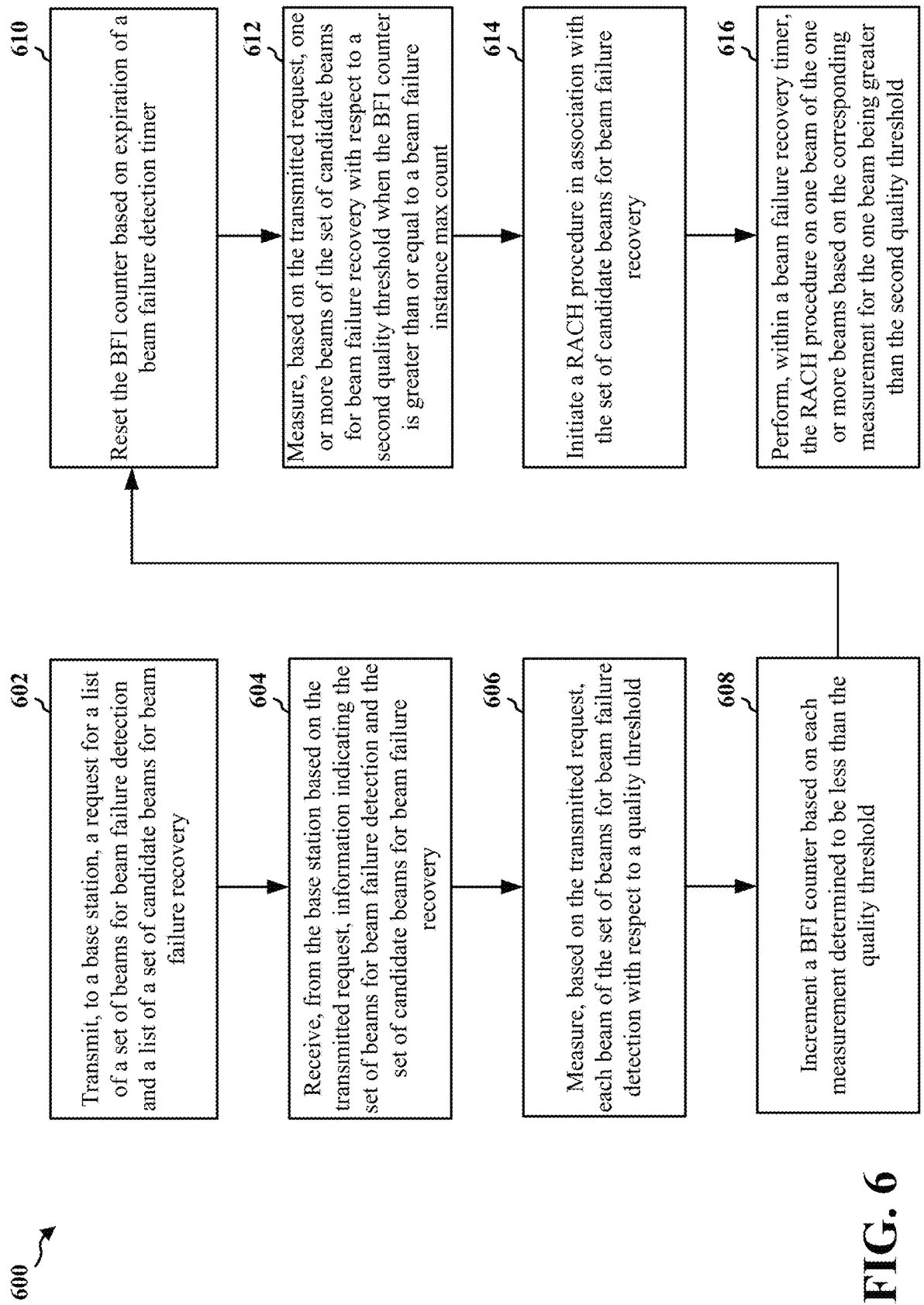
FIG. 6 is a flowchart of a method of wireless communication at a UE.

FIG. 6 is a flowchart 600 of a method of wireless communication. The method may be performed by a UE 104, which may include the memory 360 and which may be the entire UE 104 or a component of the UE 104, such as the TX processor 368, the RX processor 356, and/or the controller/processor 359.

At 602, the UE may transmit, to a base station, a request for a list of a set of beams for beam failure detection and a list of a set of candidate beams for beam failure recovery. For example, referring to FIG. 4, the UE 402 may transmit at 406 a request for both a set of beams for BFD and a set of candidate beams for BFR. The request may be transmitted (e.g., at 406) through one of a PUCCH, a PUSCH, or a RACH. The set of beams (e.g., requested at 406) for beam failure detection may be associated with one of one cell of the base station 404 or a plurality of cells of a set of base stations, the set of base stations including the base station 404. Similarly, the set of candidate beams (e.g., requested at 406) for beam failure recovery may be associated with one of one cell of the base station 404 or a plurality of cells of a set of base stations, the set of base stations including the base station 404.

At 604, the UE may receive, from the base station based on the transmitted request, information indicating the set of beams for beam failure detection and the set of candidate beams for beam failure recovery. For example, referring to FIG. 4, the UE 402 may receive from the base station 404, based on the request transmitted at 406, an indication of beam sets for BFD and BFR. The information received by the UE 402 at 408 may be received through a RRC configuration.

At 606, the UE may measure, based on the transmitted request, each beam of the set of beams for beam failure detection $\bar{q}_0$ with respect to a quality threshold $Q_{out,LR}$. For example, referring to FIG. 5, the beams in the $q_0$ set may be measured for BFD based on a comparison of a measurement value of the beams in the $q_0$ set to a measurement/quality threshold.

At 608, the UE may increment a BFI counter (BFI_COUNTER) based on each measurement determined to be less than the quality threshold $Q_{out,LR}$. For example, referring to FIG. 5, the BFI counter may be incremented from 0 to 1, from 1 to 2, etc., for each measurement value of a beam in the $q_0$ set that is determined to be less than the measurement/quality threshold.

At 610, the UE may reset the BFI_COUNTER based on expiration of a beam failure detection timer (beamFailureDetectionTimer). For example, referring to FIG. 5, the BFI counter may be reset from 1 to 0 when the BFD timer expires.

At 612 the UE may measure, based on the transmitted request, one or more beams of the set of candidate beams for beam failure recovery $\bar{q}_1$ with respect to a second quality threshold $Q_{in,LR}$ when the BFI_COUNTER is greater than or equal to a beam failure instance max count (beamFailureInstanceMaxCount). For example, referring to FIG. 5, if the BFI counter is incremented to a maximum count of 2, the UE may measure candidate beams in the $q_1$ set to determine whether a second measurement value of the candidate beams exceeds a second measurement/quality threshold for BFR.

At 614, the UE may initiate a RACH procedure in association with the set of candidate beams for beam failure recovery $\bar{q}_1$. For example, referring to FIG. 5, if the second measurement value is greater than the second measurement/quality threshold, the UE may initiate a RACH procedure for a candidate beam in the $q_1$ set.

At 616, the UE may perform, within a beam failure recovery timer (beamFailureRecoveryTimer), the RACH procedure on one beam of the one or more beams based on the corresponding measurement for the one beam being greater than the second quality threshold $Q_{in,LR}$. For example, referring to FIG. 5, the RACH procedure may be performed on a beam in the $q_1$ set before the BFR timer expires when the second measurement value is greater than the second measurement/quality threshold.

Figure 7:
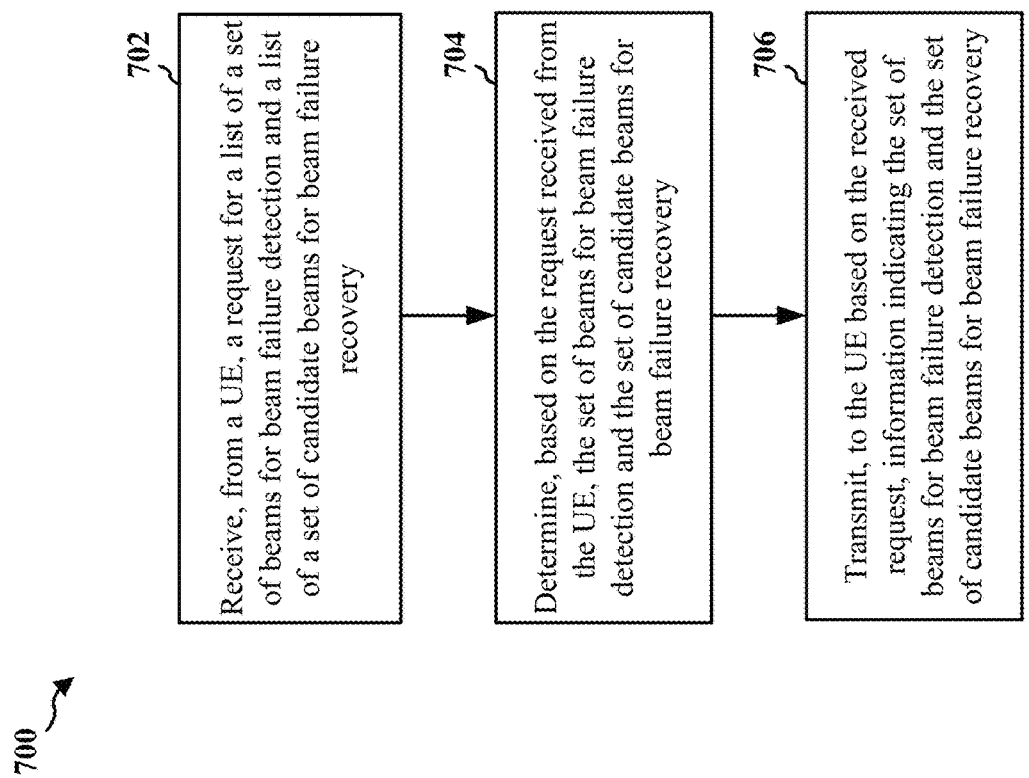
FIG. 7 is a flowchart of a method of wireless communication at a base station.

FIG. 7 is a flowchart 700 of a method of wireless communication. The method may be performed by a base station 102, which may include the memory 376 and which may be the entire base station 102 or a component of the base station 102, such as the TX processor 316, the RX processor 370, and/or the controller/processor 375.

At 702, the base station may receive, from a UE, a request for a list of a set of beams for beam failure detection and a list of a set of candidate beams for beam failure recovery. For example, referring to FIG. 4, the base station 404 may receive, at 406, a request for both a set of beams for BFD and a set of candidate beams for BFR. The request may be received (e.g., at 406) through one of a PUCCH, a PUSCH, or a RACH. The set of beams (e.g., requested at 406) for beam failure detection may be associated with one of one cell of the base station 404 or a plurality of cells of a set of base stations, the set of base stations including the base station 404. Similarly, the set of candidate beams (e.g., requested at 406) for beam failure recovery may be associated with one of one cell of the base station 404 or a plurality of cells of a set of base stations, the set of base stations including the base station 404.

At 704, the base station may determine, based on the request received from the UE, the set of beams for beam failure detection and the set of candidate beams for beam failure recovery. For example, referring to FIG. 4, the base station 404 may determine, at 407, beam sets for BFD and BFR based on the request received, at 406, from the UE 402.

At 706, the base station may transmit, to the UE based on the received request, information indicating the set of beams for beam failure detection and the set of candidate beams for beam failure recovery. For example, referring to FIGS. 4-5, the base station 404 may transmit to the UE 402, based on the request received at 406, an indication of beam sets for BFD and BFR. The information transmitted from the base station at 408 may be transmitted through a RRC configuration. In aspects, each beam of the set of beams for beam failure detection $\bar{q}_0$ may be measured with respect to a quality threshold $Q_{out,LR}$. For example, in the diagram 500, the beams in the $q_0$ set may be measured for BFD based on a comparison of a measurement value of the beams in the $q_0$ set to a measurement/quality threshold. A BFI counter (BFI_COUNTER) may be incremented based on each measurement determined to be less than the quality threshold $Q_{out,LR}$. For example, in the diagram 500, the BFI counter may be incremented from 0 to 1, from 1 to 2, etc., for each measurement value of a beam in the $q_0$ set that is determined to be less than the measurement/quality threshold. The BFI_COUNTER may be reset based on expiration of a beam failure detection timer (beamFailureDetectionTimer). For example, in the diagram 500, the BFI counter may be reset from 1 to 0 when the BFD timer expires.

In further aspects, one or more beams of the set of candidate beams for beam failure recovery $\bar{q}_1$ may be measured with respect to a second quality threshold $Q_{in,LR}$ when the BFI_COUNTER is greater than or equal to a beam failure instance max count (beamFailureInstanceMaxCount). For example, in the diagram 500, if the BFI counter is incremented to a maximum count of 2, the UE may measure candidate beams in the $q_1$ set to determine whether a second measurement value of the candidate beams exceeds a second measurement/quality threshold for BFR. A RACH procedure may be initiated in association with the set of candidate beams for beam failure recovery $\bar{q}_1$. For example, in the diagram 500, if the second measurement value is greater than the second measurement/quality threshold, the UE may initiate a RACH procedure for a candidate beam in the $q_1$ set. The RACH procedure may be performed, within a beam failure recovery timer (beamFailureRecoveryTimer), on one beam of the one or more beams based on the corresponding measurement for the one beam being greater than the second quality threshold $Q_{in,LR}$. For example, in the diagram 500, the RACH procedure may be performed on a beam in the $q_1$ set before the BFR timer expires when the second measurement value is greater than the second measurement/quality threshold.

Figure 8:
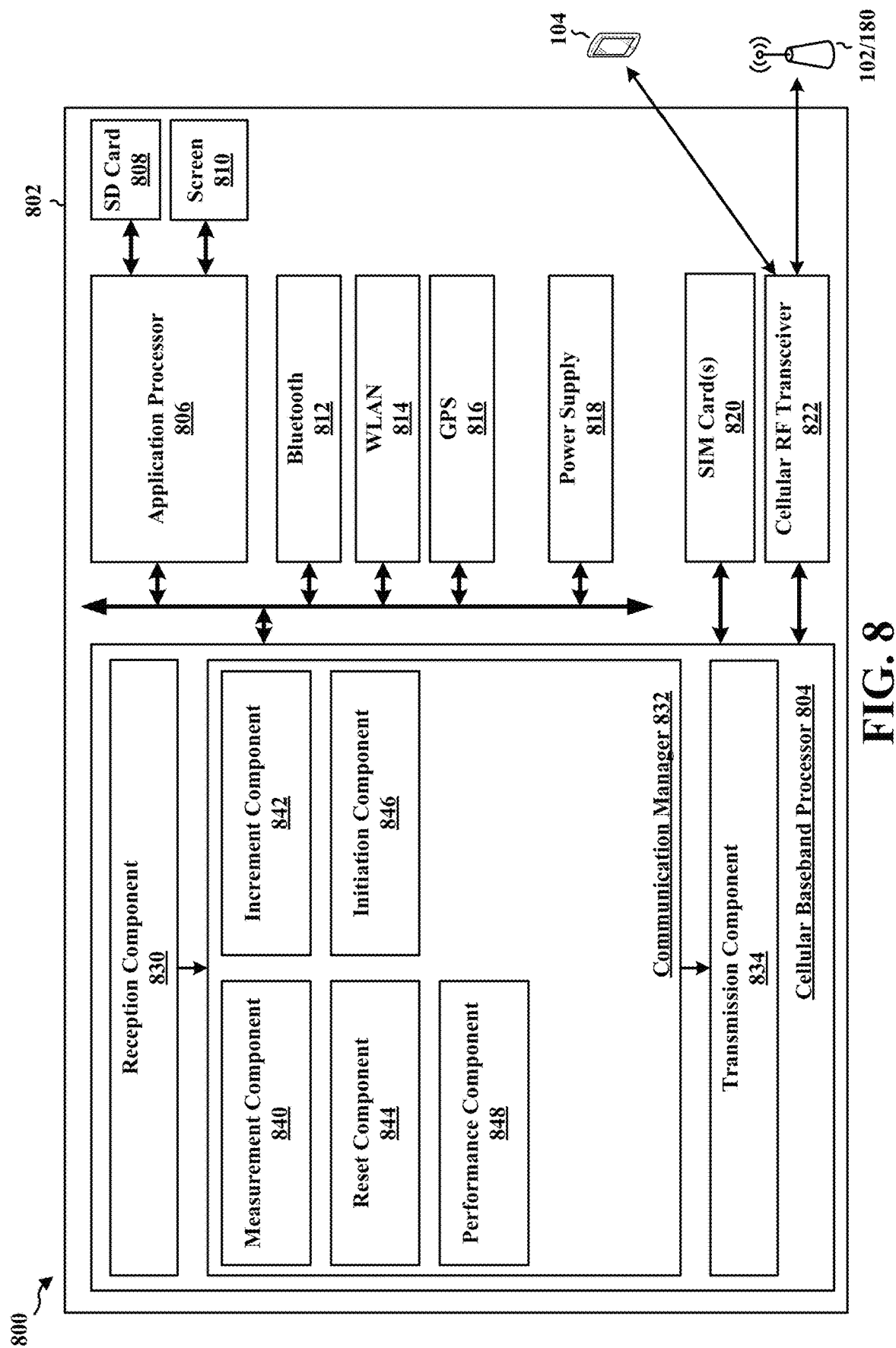
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a measurement component 840 that is configured, e.g., as described in connection with 606 and 612, to measure, based on the transmitted request, each beam of the set of beams for beam failure detection with respect to a quality threshold; and to measure, based on the transmitted request, one or more beams of the set of candidate beams for beam failure recovery with respect to a second quality threshold when the BFI counter is greater than or equal to a beam failure instance max count. The communication manager 832 further includes an increment component 842 that is configured, e.g., as described in connection with 608, to increment a BFI counter based on each measurement determined to be less than the quality threshold. The communication manager 832 further includes a reset component 844 that is configured, e.g., as described in connection with 610, to reset the BFI counter based on expiration of a beam failure detection timer. The communication manager 832 further includes an initiation component 846 that is configured, e.g., as described in connection with 614, to initiate a RACH procedure in association with the set of candidate beams for beam failure recovery. The communication manager 832 further includes a performance component 848 that is configured, e.g., as described in connection with 616, to perform, within a beam failure recovery timer, the RACH procedure on one beam of the one or more beams based on the corresponding measurement for the one beam being greater than the second quality threshold.

The reception component 830 is configured, e.g., as described in connection with 604, to receive, from the base station based on the transmitted request, information indicating the set of beams for beam failure detection and the set of candidate beams for beam failure recovery. The transmission component 834 is configured, e.g., as described in connection with 602, to transmit, to a base station, a request for a list of a set of beams for beam failure detection and a list of a set of candidate beams for beam failure recovery.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for transmitting, to a base station, a request for a list of a set of beams for beam failure detection and a list of a set of candidate beams for beam failure recovery; and means for receiving, from the base station based on the transmitted request, information indicating the set of beams for beam failure detection and the set of candidate beams for beam failure recovery. The apparatus 802 further includes means for measuring, based on the transmitted request, each beam of the set of beams for beam failure detection $\bar{q}_0$ with respect to a quality threshold $Q_{out,LR}$; means for incrementing a BFI counter (BFI_COUNTER) based on each measurement determined to be less than the quality threshold $Q_{out,LR}$; and means for resetting the BFI_COUNTER based on expiration of a beam failure detection timer (beamFailureDetectionTimer). The apparatus 802 further includes means for measuring, based on the transmitted request, one or more beams of the set of candidate beams for beam failure recovery $\bar{q}_0$ with respect to a second quality threshold $Q_{in,LR}$ when the BFI_COUNTER is greater than or equal to a beam failure instance max count (beamFailureInstanceMaxCount); means for initiating a RACH procedure in association with the set of candidate beams for beam failure recovery $\bar{q}_1$; and means for performing, within a beam failure recovery timer (beamFailureRecoveryTimer), the RACH procedure on one beam of the one or more beams based on the corresponding measurement for the one beam being greater than the second quality threshold $Q_{in,LR}$.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
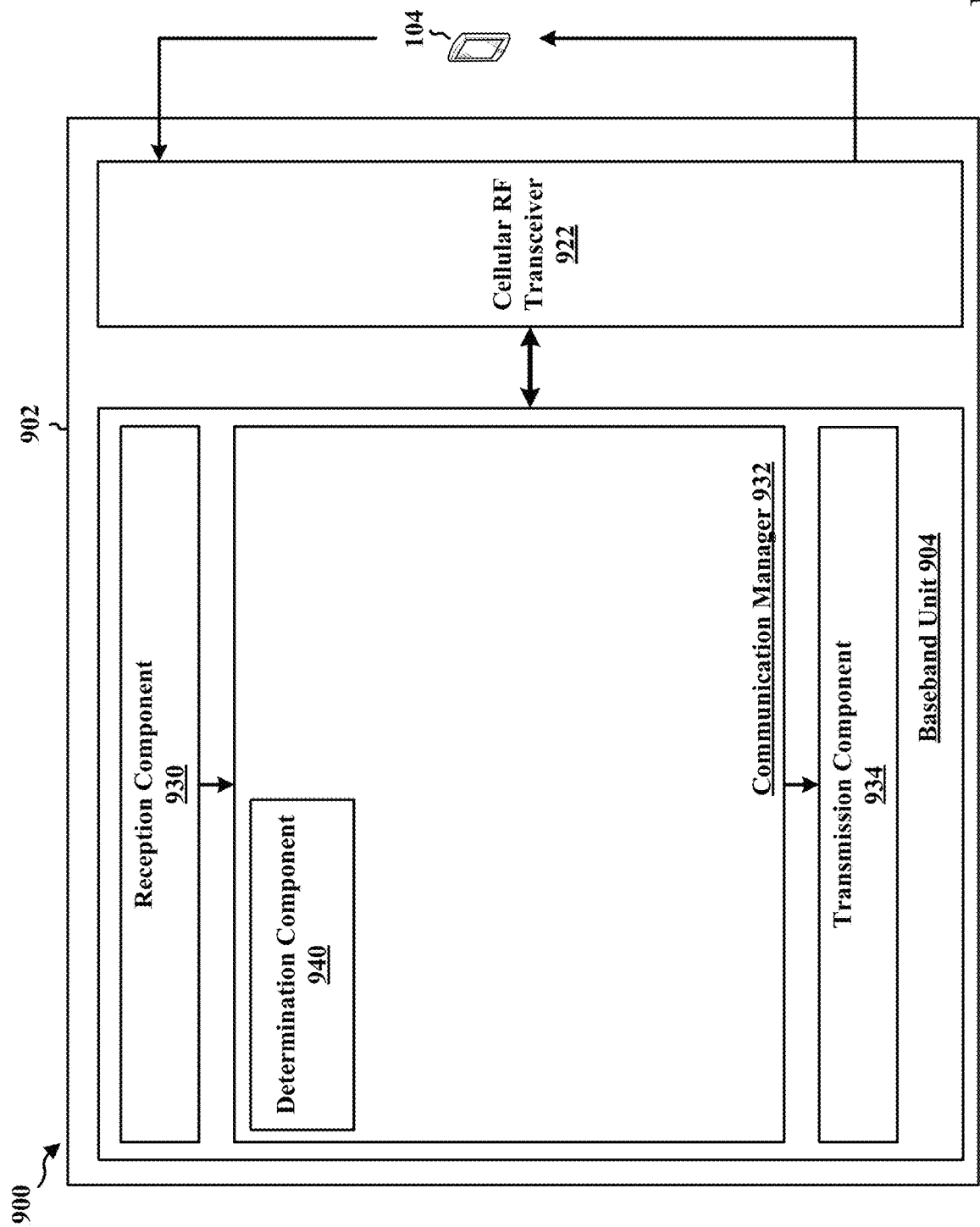
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a determination component 940 that is configured, e.g., as described in connection with 704, to determine, based on the request received from the UE, the set of beams for beam failure detection and the set of candidate beams for beam failure recovery. The reception component 930 is configured, e.g., as described in connection with 702, to receive, from a UE, a request for a list of a set of beams for beam failure detection and a list of a set of candidate beams for beam failure recovery. The transmission component 934 is configured, e.g., as described in connection with 706, to transmit, to the UE based on the received request, information indicating the set of beams for beam failure detection and the set of candidate beams for beam failure recovery.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving, from a UE, a request for a list of a set of beams for beam failure detection and a list of a set of candidate beams for beam failure recovery; and means for transmitting, to the UE based on the received request, information indicating the set of beams for beam failure detection and the set of candidate beams for beam failure recovery. The apparatus 902 further includes means for determining, based on the request received from the UE, the set of beams for beam failure detection and the set of candidate beams for beam failure recovery.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, the UE may be configured to determine based on movements, rotations, interference patterns, etc., that reception of information on a serving beam is hindered (e.g., by a temporary or permanent obstruction) but that a different beam, such as a beam outside the RS beam sets, may be a suitable alternative to the serving beam. As such, the UE may send a request to the base station including a suitable list of RS beam sets to be used for BFD and/or BFR. If, based on the transmitted request, the base station authorizes the UE to utilize the requested beams in the list, the base station may configure the UE based on all or part of the requested list. The requested list may include beams that are associated with a same cell (e.g., a Pcell or a PScell), or the requested list may include beam subsets that are associated with different cells.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, including: transmitting, to a base station, a request for a list of a set of beams for beam failure detection and a list of a set of candidate beams for beam failure recovery; and receiving, from the base station based on the transmitted request, information indicating the set of beams for beam failure detection and the set of candidate beams for beam failure recovery.

Aspect 2 may be combined with aspect 1 and includes that the request is transmitted through one of a PUCCH, a PUSCH, or a RACH.

Aspect 3 may be combined with any of aspects 1-2 and includes that the information is received through a RRC configuration.

Aspect 4 may be combined with any of aspects 1-3 and includes that the set of beams for beam failure detection is associated with one of one cell of the base station or a plurality of cells of a set of base stations, the set of base stations including the base station.

Aspect 5 may be combined with any of aspects 1-4 and includes that the set of candidate beams for beam failure recovery is associated with one of one cell of the base station or a plurality of cells of a set of base stations, the set of base stations including the base station.

Aspect 6 may be combined with any of aspects 1-5 and further includes measuring, based on the transmitted request, each beam of the set of beams for beam failure detection $\bar{q}_0$ with respect to a quality threshold $Q_{out,LR}$; incrementing a BFI counter (BFI_COUNTER) based on each measurement determined to be less than the quality threshold $Q_{out,LR}$; and resetting the BFI_COUNTER based on expiration of a beam failure detection timer (beamFailureDetectionTimer).

Aspect 7 may be combined with any of aspects 1-6 and further includes measuring, based on the transmitted request, one or more beams of the set of candidate beams for beam failure recovery $\bar{q}_1$ with respect to a second quality threshold $Q_{in,LR}$ when the BFI_COUNTER is greater than or equal to a beam failure instance max count (beamFailureInstanceMaxCount); initiating a RACH procedure in association with the set of candidate beams for beam failure recovery $\bar{q}_1$; and performing, within a beam failure recovery timer (beamFailureRecoveryTimer), the RACH procedure on one beam of the one or more beams based on the corresponding measurement for the one beam being greater than the second quality threshold $Q_{in,LR}$.

Aspect 8 is a method of wireless communication at a base station, including: receiving, from a UE, a request for a list of a set of beams for beam failure detection and a list of a set of candidate beams for beam failure recovery; and transmitting, to the UE based on the received request, information indicating the set of beams for beam failure detection and the set of candidate beams for beam failure recovery.

Aspect 9 may be combined with aspect 8 and further includes determining, based on the request received from the UE, the set of beams for beam failure detection and the set of candidate beams for beam failure recovery.

Aspect 10 may be combined with any of aspects 8-9 and includes that the request is received through one of a PUCCH, a PUSCH, or a RACH.

Aspect 11 may be combined with any of aspects 8-10 and includes that the information is transmitted through a RRC configuration.

Aspect 12 may be combined with any of aspects 8-11 and includes that the set of beams for beam failure detection is associated with one of one cell of the base station or a plurality of cells of a set of base stations, the set of base stations including the base station.

Aspect 13 may be combined with any of aspects 8-12 and includes that the set of candidate beams for beam failure recovery is associated with one of one cell of the base station or a plurality of cells of a set of base stations, the set of base stations including the base station.

Aspect 14 may be combined with any of aspects 8-13 and includes that each beam of the set of beams for beam failure detection $\bar{q}_0$ is measured with respect to a quality threshold $Q_{out,LR}$, a BFI counter (BFI_COUNTER) is incremented based on each measurement determined to be less than the quality threshold $Q_{out,LR}$, and the BFI_COUNTER is reset based on expiration of a beam failure detection timer (beamFailureDetectionTimer).

Aspect 15 may be combined with any of aspects 8-14 and includes that one or more beams of the set of candidate beams for beam failure recovery $\bar{q}_1$ is measured with respect to a second quality threshold $Q_{in,LR}$ when the BFI_COUNTER is greater than or equal to a beam failure instance max count (beamFailureInstanceMaxCount), a RACH procedure is initiated in association with the set of candidate beams for beam failure recovery $\bar{q}_1$, and the RACH procedure is performed, within a beam failure recovery timer (beamFailureRecoveryTimer), on one beam of the one or more beams based on the corresponding measurement for the one beam being greater than the second quality threshold $Q_{in,LR}$.

Aspect 16 is an apparatus for wireless communication including at least one processor coupled to a memory and configured to implement a method as in any of aspects 1-15.

Aspect 17 is the apparatus of aspect 16, further including a transceiver coupled to the at least one processor.

Aspect 18 is an apparatus for wireless communication including means for implementing a method as in any of aspects 1-15.

Aspect 19 is a non-transitory computer-readable storage medium storing computer executable code, the code when executed by at least one processor causes the at least one processor to implement a method as in any of aspects 1-15.

What is claimed is:

1. A method of wireless communication at a user equipment (UE), comprising:
   transmitting, to a base station, a request including a list of a set of beams for beam failure detection and a list of a set of candidate beams for beam failure recovery; and
   receiving, from the base station based on the transmitted request, information indicating at least part of the set of beams for beam failure detection and at least part of the set of candidate beams for beam failure recovery.

2. The method of claim 1, wherein the request is transmitted through one of a physical uplink control channel (PUCCH), a physical uplink shared channel (PUSCH), or a random access channel (RACH).

3. The method of claim 1, wherein the set of beams for beam failure detection is associated with one of one cell of the base station or a plurality of cells of a set of base stations, the set of base stations including the base station.

4. The method of claim 1, wherein the set of candidate beams for beam failure recovery is associated with one of one cell of the base station or a plurality of cells of a set of base stations, the set of base stations including the base station.

5. The method of claim 1, further comprising:
   measuring, based on the transmitted request, each beam of the set of beams for beam failure detection $\bar{q}_0$ with respect to a quality threshold $Q_{out,LR}$;
   incrementing a beam failure indicator (BFI) counter (BFI_COUNTER) based on each measurement determined to be less than the quality threshold $Q_{out,LR}$; and resetting the BFI_COUNTER based on expiration of a beam failure detection timer (beamFailureDetectionTimer).

6. The method of claim 5, further comprising:

measuring, based on the transmitted request, one or more beams of the set of candidate beams for beam failure recovery $\bar{q}_1$ with respect to a second quality threshold $Q_{in,LR}$ when the BFI_COUNTER is greater than or equal to a beam failure instance max count (beamFailureInstanceMaxCount);

initiating a random access channel (RACH) procedure in association with the set of candidate beams for beam failure recovery $\bar{q}_1$; and performing, within a beam failure recovery timer (beamFailureRecoveryTimer), the RACH procedure on one beam of the one or more beams based on a corresponding measurement for the one beam being greater than the second quality threshold $Q_{in,LR}$.

7. The method of claim 1, further comprising:

determining that at least one serving beam of the UE is hindered by at least one of movement of the UE, rotation of the UE, or an interference pattern, wherein transmitting the request is based on the determination.

8. A method of wireless communication at a base station, comprising:

receiving, from a user equipment (UE), a request including a list of a set of beams for beam failure detection and a list of a set of candidate beams for beam failure recovery; and transmitting, to the UE based on the received request, information indicating at least part of the set of beams for beam failure detection and at least part of the set of candidate beams for beam failure recovery.

9. The method of claim 8, further comprising determining, based on the request received from the UE, the at least part of the set of beams for beam failure detection and the at least part of the set of candidate beams for beam failure recovery.

10. The method of claim 8, wherein the request is received through one of a physical uplink control channel (PUCCH), a physical uplink shared channel (PUSCH), or a random access channel (RACH).

11. The method of claim 8, wherein the set of beams for beam failure detection is associated with one of one cell of the base station or a plurality of cells of a set of base stations, the set of base stations including the base station.

12. The method of claim 8, wherein the set of candidate beams for beam failure recovery is associated with one of one cell of the base station or a plurality of cells of a set of base stations, the set of base stations including the base station.

13. The method of claim 8, wherein each beam of the set of beams for beam failure detection $\bar{q}_0$ is measured with respect to a quality threshold $Q_{out,LR}$, a beam failure indicator (BFI) counter (BFI_COUNTER) is incremented based on each measurement determined to be less than the quality threshold $Q_{out,LR}$, and the BFI_COUNTER is reset based on expiration of a beam failure detection timer (beamFailureDetectionTimer).

14. The method of claim 13, wherein one or more beams of the set of candidate beams for beam failure recovery $\bar{q}_1$ is measured with respect to a second quality threshold $Q_{in,LR}$ when the BFI_COUNTER is greater than or equal to a beam failure instance max count (beamFailureInstanceMaxCount), a random access channel (RACH) procedure is initiated in association with the set of candidate beams for beam failure recovery $\bar{q}_1$, and the RACH procedure is performed, within a beam failure recovery timer (beamFailureRecoveryTimer), on one beam of the one or more beams based on a corresponding measurement for the one beam being greater than the second quality threshold $Q_{in,LR}$.

15. An apparatus for wireless communication at a user equipment (UE), comprising:

a memory; and at least one processor coupled to the memory and configured to:

transmit, to a base station, a request including a list of a set of beams for beam failure detection and a list of a set of candidate beams for beam failure recovery; and receive, from the base station based on the transmitted request, information indicating at least part of the set of beams for beam failure detection and at least part of the set of candidate beams for beam failure recovery.

16. The apparatus of claim 15, wherein the at least one processor is configured to transmit the request through one of a physical uplink control channel (PUCCH), a physical uplink shared channel (PUSCH), or a random access channel (RACH).

17. The apparatus of claim 15, wherein the at least one processor is configured to receive the information through a radio resource control (RRC) configuration.

18. The apparatus of claim 15, wherein the set of beams for beam failure detection is associated with one of one cell of the base station or a plurality of cells of a set of base stations, the set of base stations including the base station.

19. The apparatus of claim 15, wherein the set of candidate beams for beam failure recovery is associated with one of one cell of the base station or a plurality of cells of a set of base stations, the set of base stations including the base station.

20. The apparatus of claim 15, wherein the at least one processor is further configured to:

measure, based on the transmitted request, each beam of the set of beams for beam failure detection $\bar{q}_0$ with respect to a quality threshold $Q_{out,LR}$;

increment a beam failure indicator (BFI) counter (BFI_COUNTER) based on each measurement determined to be less than the quality threshold $Q_{out,LR}$; and reset the BFI_COUNTER based on expiration of a beam failure detection timer (beamFailureDetectionTimer).

21. The apparatus of claim 20, wherein the at least one processor is further configured to:

measure, based on the transmitted request, one or more beams of the set of candidate beams for beam failure recovery $\bar{q}_1$ with respect to a second quality threshold $Q_{in,LR}$ when the BFI_COUNTER is greater than or equal to a beam failure instance max count (beamFailureInstanceMaxCount);

initiate a random access channel (RACH) procedure in association with the set of candidate beams for beam failure recovery $\bar{q}_1$; and perform, within a beam failure recovery timer (beamFailureRecoveryTimer), the RACH procedure on one beam of the one or more beams based on a corresponding measurement for the one beam being greater than the second quality threshold $Q_{in,LR}$.

22. The apparatus of claim 15, further comprising a transceiver coupled to the at least one processor.

23. The apparatus of claim 15, wherein the at least one processor is configured to:

determine that at least one serving beam of the UE is hindered by at least one of movement of the UE, rotation of the UE, or an interference pattern, wherein to transmit the request, the at least one processor is configured to transmit the request is based on the determination.

24. An apparatus for wireless communication at a base station, comprising:
a memory; and
at least one processor coupled to the memory and configured to:
receive, from a user equipment (UE), a request including a list of a set of beams for beam failure detection and a list of a set of candidate beams for beam failure recovery; and
transmit, to the UE based on the received request, information indicating at least part of the set of beams for beam failure detection and at least part of the set of candidate beams for beam failure recovery.

25. The apparatus of claim 24, further comprising determining, based on the request received from the UE, the at least part of the set of beams for beam failure detection and the at least part of the set of candidate beams for beam failure recovery.

26. The apparatus of claim 24, wherein the at least one processor is configured to receive the request through one of a physical uplink control channel (PUCCH), a physical uplink shared channel (PUSCH), or a random access channel (RACH).

27. The apparatus of claim 24, wherein the at least one processor is configured to transmit the information through a radio resource control (RRC) configuration.

28. The apparatus of claim 24, wherein the set of beams for beam failure detection is associated with one of one cell of the base station or a plurality of cells of a set of base stations, the set of base stations including the base station.

29. The apparatus of claim 24, wherein the set of candidate beams for beam failure recovery is associated with one of one cell of the base station or a plurality of cells of a set of base stations, the set of base stations including the base station.

30. The apparatus of claim 24, wherein each beam of the set of beams for beam failure detection $\bar{q}_0$ is measured with respect to a quality threshold $Q_{out,LR}$, a beam failure indicator (BFI) counter (BFI_COUNTER) is incremented based on each measurement determined to be less than the quality threshold $Q_{out,LR}$, and the BFI_COUNTER is reset based on expiration of a beam failure detection timer (beamFailureDetectionTimer).

31. The apparatus of claim 30, wherein one or more beams of the set of candidate beams for beam failure recovery $\bar{q}_1$ is measured with respect to a second quality threshold $Q_{in,LR}$ when the BFI_COUNTER is greater than or equal to a beam failure instance max count (beamFailureInstanceMaxCount), a random access channel (RACH) procedure is initiated in association with the set of candidate beams for beam failure recovery $\bar{q}_1$, and the RACH procedure is performed, within a beam failure recovery timer (beamFailureRecoveryTimer), on one beam of the one or more beams based on a corresponding measurement for the one beam being greater than the second quality threshold $Q_{in,LR}$.

32. The apparatus of claim 24, further comprising a transceiver coupled to the at least one processor.

* * * * *